(12) United States Patent
Oyama et al.

(10) Patent No.: US 8,442,371 B2
(45) Date of Patent: May 14, 2013

(54) TIGHT-BUFFERED OPTICAL FIBERS AND OPTICAL FIBER CABLES

(75) Inventors: Tatsuya Oyama, Tokyo (JP); Toshiaki Ozawa, Tokyo (JP)

(73) Assignee: Furukawa Electric Co., Ltd., Tokyo (JP)

(*) Notice: Subject to any disclaimer, the term of this patent is extended or adjusted under 35 U.S.C. 154(b) by 150 days.

(21) Appl. No.: 12/566,736

(22) Filed: Sep. 25, 2009

(65) Prior Publication Data

US 2010/0086270 A1    Apr. 8, 2010

Related U.S. Application Data

(63) Continuation of application No. PCT/JP2009/054892, filed on Mar. 13, 2009.

(30) Foreign Application Priority Data

Mar. 14, 2008 (JP) ................................. 2008-065527

(51) Int. Cl.
*G02B 6/44* (2006.01)
(52) U.S. Cl.
USPC .......................................................... 385/102
(58) Field of Classification Search ............ 385/102
See application file for complete search history.

(56) References Cited

U.S. PATENT DOCUMENTS

| | | | |
|---|---|---|---|
| 2005/0254765 A1* | 11/2005 | Seifert et al. | 385/123 |
| 2007/0031094 A1* | 2/2007 | Watahiki et al. | 385/102 |
| 2007/0077016 A1* | 4/2007 | Bickham et al. | 385/128 |

FOREIGN PATENT DOCUMENTS

| | | | | |
|---|---|---|---|---|
| JP | 2004-85741 | | 3/2004 | |
| JP | 3955829 | | 9/2004 | |
| JP | 2005-62769 A | | 3/2005 | |
| JP | 2005-84096 A | | 3/2005 | |
| JP | 02005189390 A | * | 7/2005 | ............ 385/102 |
| JP | 2006-10717 A | | 1/2006 | |
| JP | 2006-208663 A | | 8/2006 | |
| JP | 2006-323072 A | | 11/2006 | |
| JP | 02005196889 A | * | 1/2007 | ............ 385/102 |
| JP | 2007-25547 A | | 2/2007 | |

* cited by examiner

*Primary Examiner* — Ryan Lepisto
*Assistant Examiner* — Jerry Blevins
(74) *Attorney, Agent, or Firm* — Oblon, Spivak, McClelland, Maier & Neustadt, L.L.P.

(57) ABSTRACT

An optical fiber cable and a tight-buffered optical fiber which suppress an increase in transmission loss in a humid and hot environment and have good manufacturability are disclosed. The tight-buffered optical fiber of the present invention comprises a glass fiber surrounded by a first coating layer and a second coating layer, the second coating layer comprising two or more layers; wherein a pull-out force is 15 N/20 mm or less in at least one pair of layers between the first coating layer and the second coating layer, or between any two layers of the second coating layer.

6 Claims, 4 Drawing Sheets

TIGHT-BUFFERED OPTICAL FIBERS AND OPTICAL FIBER CABLES

CROSS-REFERENCES TO RELATED APPLICATIONS

This application is a continuation application of International Application No. PCT/JP2009/054892, filed on Mar. 13, 2009, the entire contents of which are incorporated by reference herein.

This application also claims the benefit of priority from Japanese Patent Application No. 2008-065527 filed Mar. 14, 2008, the entire contents of which is incorporated herein by reference.

TECHNICAL FIELD

The present invention relates to tight-buffered optical fibers and optical fiber cables. More particularly, the invention relates to tight-buffered optical fibers, which are less likely to increase transmission loss when they are exposed to a humid and hot environment, and to optical fiber cables comprising such fibers.

BACKGROUND OF THE INVENTION

In optical fiber manufacturing, during the drawing process, a coating resin is coated around the circumference of a silica glass fiber immediately after the silica glass fiber is drawn to prevent strength reduction of the resulting optical fiber. An ultraviolet-curable resin, particularly a urethane-acrylate-type or an epoxy-acrylate-type, is generally used as the coating resin for the optical fiber.

An optical fiber increases transmission loss due to various external stresses and microbends caused by such external stresses. To protect the optical fiber from such external stresses, the optical fiber is usually coated with two layers (a soft layer and a hard layer) of coatings. For the inner layer, which directly contacts the silica glass, a soft resin with low Young's modulus is used as a buffer layer (hereafter a primary layer); and for the outer layer, a hard resin with high Young's modulus is used as a protective layer (hereafter a secondary layer). Conventionally, a resin with less than 3 MPa in Young's modulus is used as the primary layer, and a resin with more than 500 MPa in Young's modulus is used as the secondary layer. Also, when it is needed, a very thin color layer is added for identification purpose.

Hereafter, in this specification, a silica-glass fiber coated with a primary layer and a secondary layer is called an optical fiber; and the combination of the primary layer and the secondary layer is called a first coating layer.

Because the optical fiber itself may not have desired strength, in some applications, the optical fiber is further coated with a second coating layer such as a thermoplastic resin or an ultraviolet-curable resin, and used as a tight-buffered optical fiber. (for example, see Japanese Patent No. 3,955,829). Furthermore, by adding a sheath, it can be used as an optical fiber cable.

When such an optical fiber cable is exposed to a humid and hot environment for a long period of time, transmission loss may increase. To create highly reliable optical fibers, which prevent the increase in transmission loss even if they are exposed to a humid and hot environment for a long period of time, various suggestions such as using a metal film or a waterproof adulterant around a tight-buffered optical fiber have been made (for example, see Japanese Patent Application Laid-open No. 2004-85741).

Because the popularity of optical fibers has grown in recent years, the number of optical fiber cable applications has similarly grown, which indicates that the environments where optical fiber cables are used have diversified and new cable structures have been developed. Because of that, the long-term reliability required for optical fiber cables has become stricter.

With the situation as stated above, an optical fiber cable, which is less likely to increase transmission loss when it is exposed to a humid and hot environment, is being considered.

However, most of the approaches disclosed until today have focused on ways to prevent moisture from reaching a tight-buffered optical fiber, or on ways to reduce the amount of the moisture reaching the tight-buffered optical fiber by changing the cable structure. In those cases, other harmful effects or reduction in manufacturability are occurred. For example, if the metal film or the waterproof adulterant is used around a tight-buffered optical fiber as described in Japanese Patent Application Laid-open No. 2004-85741, when the tight-buffered optical fiber is removed from an optical fiber cable, the metal film or the waterproof adulterant interferes with the removal process and reduces its manufacturability.

SUMMARY OF THE INVENTION

It is an object of the present invention to at least partially solve the problems in the conventional technology.

In accordance with the present invention, a tight-buffered optical fiber comprises a glass fiber surrounded by a first coating layer; and a second coating layer, which has two or more layers that surround the first coating layer; wherein the pull-out force is 15 N/20 mm or less in at least one pair of layers between the first coating layer and the second coating layer, or between any two layers among the second coating layer.

Also, an optical fiber cable according to the present invention comprises the tight-buffered optical fiber, as described above, and a sheath around the tight-buffered optical fiber; wherein the pull-out force between the tight-buffered optical fiber and the sheath is 20 N/10 mm or less.

BRIEF DESCRIPTION OF THE DRAWINGS

Referring now to the drawings.

DETAIL DESCRIPTION

Below, tight-buffered optical fibers and optical fiber cables according the present invention are explained in detail using figures.

Figure 1:
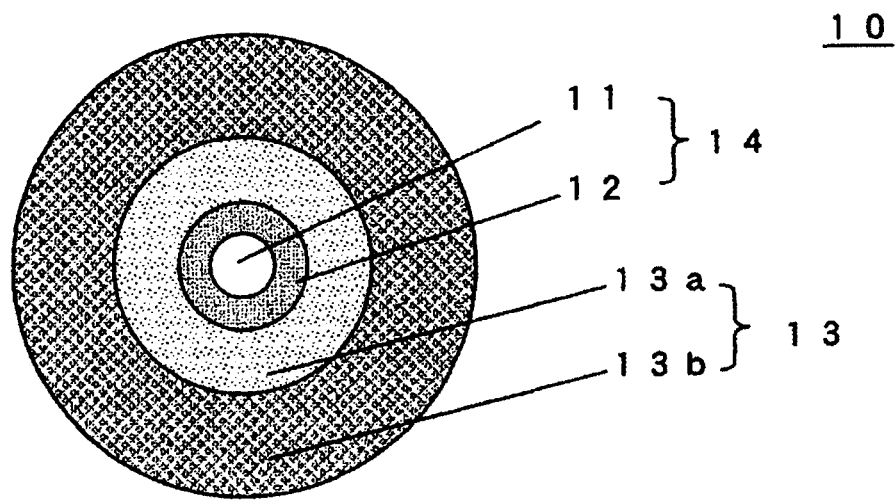
FIG. 1 is a cross-sectional view of a tight-buffered optical fiber as an embodiment of the present invention.

FIG. 1 is a cross-sectional view of a tight-buffered optical fiber 10 as an embodiment of the present invention. The tight-buffered optical fiber 10 comprises a glass fiber 11, a first coating layer 12 at the circumference of the glass fiber 11 to form an optical fiber 14, and a second coating layer 13 at the circumference of the optical fiber 14.

Similar to a conventional tight-buffered optical fiber, in the tight-buffered optical fiber 10, ultraviolet-curable resin or the like is used as the first coating layer 12, and the coating is applied around the circumference of the drawn glass fiber. Also, the first coating layer contains a primary layer and a secondary layer. When an ultraviolet-curable resin is used for the first coating layer, a urethane-acrylate-type resin is preferred. Because the resin has flexibility, it can be used as a buffer for a bare glass surface.

The second coating layer of the tight-buffered optical fiber 10 has more than two layers. In FIG. 1, for example, a two-layer structure of the second coating layer 13 (an inner second coating layer 13a and an outer second coating layer 13b) is shown. The second coating layer 13 is a thermoplastic resin, an ultraviolet-curable resin, or the like. The coating resin used in the second coating layer is preferably a resin having a Young's modulus between 50 MPa and 1,500 MPa from a standpoint of handling the tight-buffered optical fiber. In particular, the inner secondary coating layer 13a should be a resin having a Young's modulus of 200 MPa or less from a standpoint of coating strip force of the tight-buffered optical fiber.

Also, to satisfy optical characteristics as an optical fiber, the outer diameter of the glass fiber 11 is preferably between 80 and 125 µm; the outer diameter of the first coating layer 12 is preferably between 125 µm and 500 µm; and the outer diameter of the second coating layer 13 is preferably between 300 µm and 1000 µm The thickness of the first coating layer 12 is preferably between 20 µm and 190 µm, and the thickness of the second coating layer 13 is preferably between 125 µm and 400 µm. Also, from a manufacturing standpoint, the thickness of each layers of the second coating layer 13 is preferably 50 µm or larger.

Figure 2:
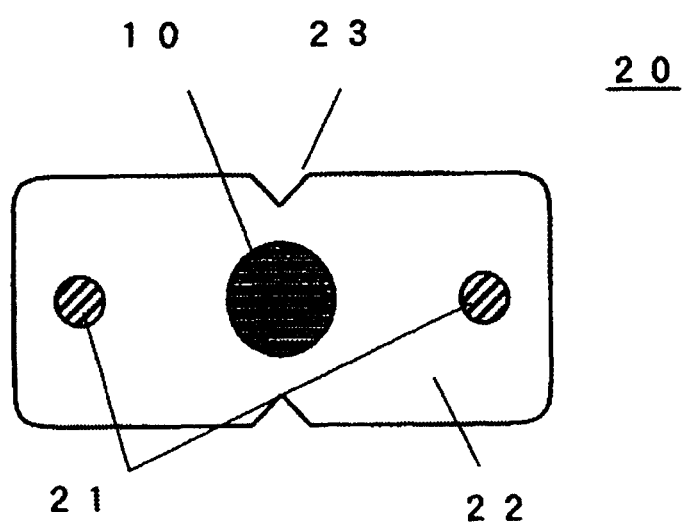
FIG. 2 is a cross-sectional view of an optical fiber cable as an embodiment of the present invention.

The structure of the optical fiber cable of the present invention can be used, for example, as a drop optical fiber cable such as shown in FIG. 2.

FIG. 2 is a cross-sectional view of an optical fiber cable 20 as an embodiment of the present invention. As shown in FIG. 2, the optical fiber cable 20 comprises the tight-buffered optical fiber 10 at the center portion of the cable 20.

On the both sides of the tight-buffered optical fiber 10, tension members 21, 21 are positioned such that the centers of the tight-buffered optical fiber 10 and the pair of tension members 21, 21 are approximately in the same plane. Material used for the tension member 21 is, for example, an aramid fiber bundle; a fiber-reinforced plastic (FRP), which uses the aramid fiber bundle as a reinforced fiber; or a steel wire.

A sheath 22 covers the tight-buffered optical fiber 10 and the pair of tension members 21, 21. The sheath 22 is made from a resin such as ethylene-vinyl acetate polymer (EVA) or ethylene-ethyl acrylate plastic (EEA), and flame retardant cart be added to the resin.

The cross-section of the optical fiber cable 20 is rectangular in shape and the longer sides of the rectangle include notch 23, whose edge points toward the tight-buffered optical fiber 10, to split the sheath 22 easily when the tight-buffered optical fiber 10 needs to be exposed. The notch 23 extends along the longitudinal direction of the cable 10.

In FIG. 2, the example only shows one tight-buffered optical fiber 10; however, the cable can have multiple tight-buffered optical fibers 10. Moreover, a single tension member 21 can be used, and the notch 23 can be omitted.

The example in FIG. 2 shows the tight-buffered optical fiber 10 with the second coating layer 13 in two layers; however, the second coating layer 13 can be more than two layers. For example, it can be three layers.

The tight-buffered optical fiber 10 has a pull-out force of 15 N/20 mm or less in at least one pair of layers between the first coating layer 12 and the second coating layer 13, or between any two layers among the two or more layers of the second coating layer (in FIG. 2, the inner second coating layer 13a and the outer second coating layer 13b).

Furthermore, the optical fiber cable of the present invention has a pull-out force of 20 N/10 mm or less between the tight buffered optical fiber and the sheath.

The characteristics described above suppress the increase in transmission loss in a humid and hot environment.

Furthermore, from the standpoint of piston characteristics of the glass fiber at the end of the tight-buffered optical fiber and temperature characteristics of the cable, a pull-out force is preferably 2 N/20 mm or more between the first coating layer 12 and the second coating layer 13, and between layers of the second coating layer 13.

And, from the standpoint of piston characteristics of the tight-buffered optical fiber at the end of the cable and temperature characteristics of the cable, the pulling force between the tight-buffered optical fiber and the sheath should be more than 1 N/10 mm.

The pulling force can be reduced, for example, by adding a silicon-type lublicant or a filling material for the second coating layer 13 or for the sheath, or by providing a thin (for example 5 µm in thickness) coating layer added lublicant between each of the layer.

The pull-out force between the tight-buffered optical fiber and the sheath can be reduced by using a pipe-extrusion method, which coats fused sheath material at low pressure with respect to the tight-buffered optical fiber during the optical fiber cable manufacturing process by controlling a cap when the sheath is extruded.

Below, examples 1-8 of tight-buffered optical fibers and optical fiber cables of the present invention are explained in detail by using comparative examples 1-5.

EXAMPLES 1-8, AND COMPARATIVE EXAMPLES 1-5

In the same structures as stated above, examples 1-8 and comparative examples 1-5 of optical fiber cables 20 are manufactured having different pull-out forces between the layers; and Young's modulus, coating strip force and increase in transmission loss in a humid and hot environment of the cables are investigated. Pull-out forces between layers are controlled by changing the amount of lublicant. The result is shown in Table 1.

As the first step of manufacturing the samples of tight-buffered optical fibers, the single mode optical fiber according to International Telecommunication Union Telecommunication Standard Sector (ITU-T) G.652 is manufactured by coating the first coating layer around the circumference of 125 um glass fibers. The outer diameter of the first coating layer is 250 µm.

As a resin for the first coating layer, urethane-acrylate-type resin is used.

Furthermore, a second coating layer (one layer or two layers) is coated around the circumference of the optical fibers to make the tight-buffered optical fibers. Examples 4 and 5 have one layer of the second coating layer, and others have two layers of the second coating layer. In order to make two layers of the second coating layer, an inner second coating layer is applied such that the outer diameter is 0.5 mm; then in a separate process, an outer second coating layer is applied such that the outer diameter is 0.9 mm. As a resin for the second coating layer, urethane-acrylate-type ultraviolet-curable resin or thermoplastic elastomer is used.

On both sides of the tight-buffered optical fiber 10, tension members 21, 21 are positioned such that the centers of the tight-buffered optical fiber 10 and the pair of tension members 21, 21 are approximately in the same plane, and the sheath 22 is coated to make an optical fiber cable 20. Steel wires are used for the tension members 21.

The cross-section of the optical fiber cable is rectangular in shape, and the longer sides of the rectangle include notch 23 that extend along the longitudinal direction of the cable.

Figure 3:
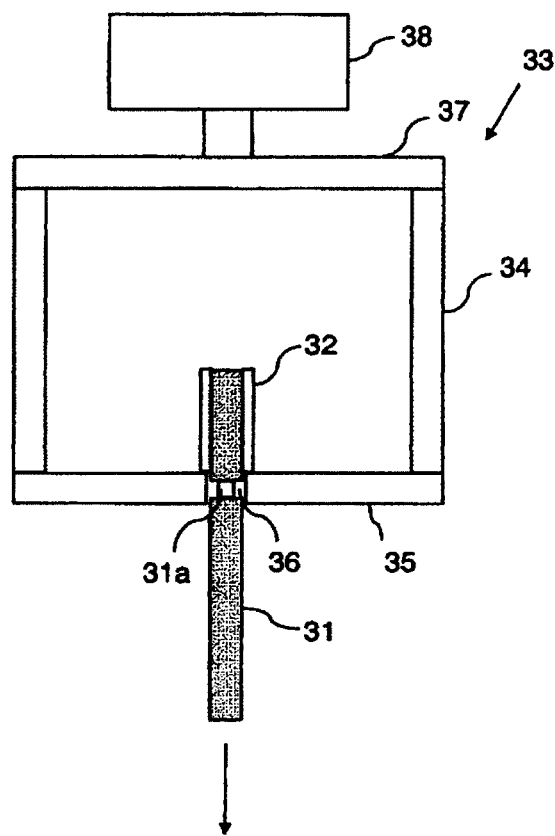
FIG. 3 is a chart, which explains measurement methods of pull-out force in each layer of the tight-buffered optical fiber.

The outer dimensions of the optical fiber cable are approximately 4.5 mm by 2.5 mm.

pull-out-force measuring method described in FIG. 3. At the end of sample tight-buffered optical fiber 31, sandpaper 32 is attached. Then, the fiber with the sandpaper is laced from the downside to a hole 36 placed on the top of a bottom horizontal base portion 35 of a hanged frame 34 of a pull-out-force measuring device 33, so that the sandpaper 32 is placed on the upper side. A cut 31a is made to between layers that measures around the tight-buffered optical fiber 31 at the underside of the sandpaper 32. Then, after the sandpaper 32 engages the bottom horizontal-base portion 35, the fiber is pulled downward at a pulling speed of 5.0 mm/minute. After an arbitrary length of the fiber is pulled out, the maximum stress is mea-

TABLE 1

| | | Examples | | | | | | | | Comparative examples | | | | |
|---|---|---|---|---|---|---|---|---|---|---|---|---|---|---|
| | | 1 | 2 | 3 | 4 | 5 | 6 | 7 | 8 | 1 | 2 | 3 | 4 | 5 |
| second coating layer material | Inner layer | UV | UV | UV | UV | UV | UV | UV | UV | thermo-plastics | UV | UV | thermo-plastics | thermo-plastics |
| | Outer layer | UV | UV | thermo-plastics | UV | thermo-plastics | UV | thermo-plastics | UV | thermo-plastics | thermo-plastics | UV | | |
| second coating layer material Young's modules | Inner layer (MPa) | 100 | 80 | 100 | 100 | 100 | 140 | 140 | 140 | 170 | 140 | 100 | 140 | 120 |
| | Outer layer (MPa) | 100 | 100 | 120 | 100 | 120 | 150 | 120 | 140 | 1300 | 140 | 140 | | |
| Glass optical fiber diameter | (μm) | 125 | 125 | 125 | 125 | 125 | 125 | 125 | 125 | 125 | 125 | 125 | 125 | 125 |
| First coating layer diameter | (μm) | 250 | 250 | 250 | 250 | 250 | 250 | 250 | 250 | 250 | 250 | 250 | 250 | 250 |
| Inner second coating layer diameter | (μm) | 500 | 500 | 500 | 500 | 500 | 500 | 500 | 500 | 500 | 500 | 500 | | |
| Outer second coating layer diameter | (μm) | 900 | 900 | 900 | 900 | 900 | 900 | 900 | 900 | 900 | 900 | 900 | 900 | 900 |
| Pull-out forces between first and second coating layers | (N/20 mm) | 12 | 5 | 7 | 2 | 13 | 15 | 18 | 11 | 17 | 18 | 13 | 15 | 20 |
| Pull-out forces between layers of the secondary coating layer | (N/20 mm) | 12 | 5 | 2 | 12 | 8 | 13 | 8 | 16 | 16 | 16 | 15 | | |
| Pull-out force between the fiber and the sheath | (N/10 mm) | 2 | 8 | 11 | 1 | 20 | 5 | 10 | 15 | 22 | 16 | 22 | 19 | 21 |
| Coating strip force | (N/20 mm) | 9 | 7 | 16 | 12 | 10 | 20 | 10 | 16 | 27 | 25 | 19 | 18 | 22 |
| Test under humid and hot environment | | Good | Good | Good | Good | Good | Good | Good | Good | Poor | Poor | Poor | Poor | Poor |

Measurements of predetermined parameters are performed in the following manner.
(Young's Modulus)

A 6 mm-wide strip specimen is made from a 0.2 mm-thick sheet, and it is measured by a 25 mm-zipper-distance Tensilon-type tensile test. The tensile test is performed at a test temperature of 23° C. and a pulling speed of 1 mm/minute. The starting point of a chart is calculated by drawing a tangent and reading the 2.5% stretch value of the actual measurement.

In the case of an ultraviolet-curable resin, a 0.2 mm-thick sheet is created by curing the resin by 200 mW/cm$^2$ of ultraviolet intensity and 1000 nJ/cm$^2$ of UV irradiation. In the case of the thermoplastic resin, a test sample is created by using a 0.2 mm-thick specimen No. 2, which is regulated by Japanese Industrial Standard (JIS) K 7113.
(Pull-Out Forces Between a First Coating Layer and a Secondary Coating Layer, and Between Layers of the Secondary Coating Layer)

Pull-out forces between a first coating layer and a secondary coating layer, and between layers of the secondary coating layer are measured from tight-buffered optical fibers by a sured from a sensor (load cell) 38 placed on a top horizontal base portion 37 of the hanged frame 34.
(Pull-Out Force Between the Tight-Buffered Optical Fiber and the Sheath)

Figure 4:
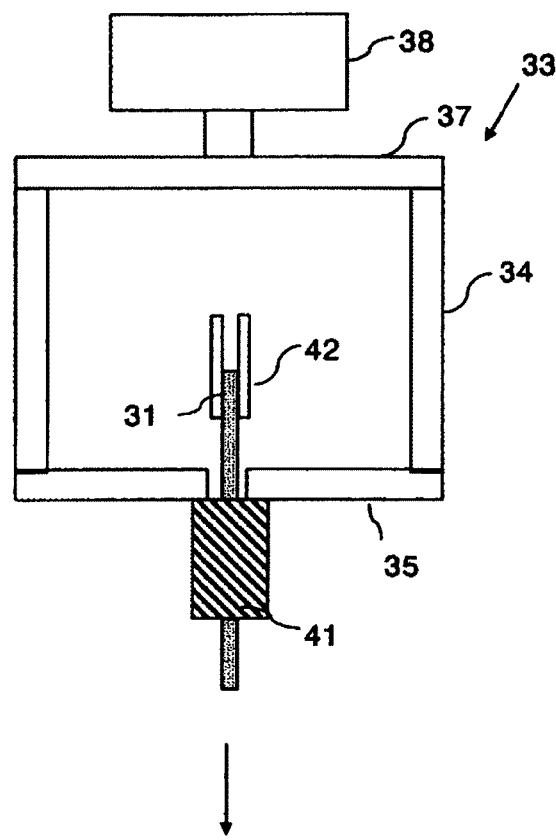
FIG. 4 is a chart, which explains measurement methods of pull-out force between a sheath of the optical fiber cable and the tight-buffered optical fiber.

Pull-out force between the tight-buffered optical fiber and the sheath is measured under a state of an optical fiber cable by the pull-out-force measurement method described in FIG. 4. At the end of the sample optical fiber cable 41, the sheath and the tension members are removed to keep only the tight-buffered optical fiber 31. Then, the tight-buffered fiber is laced from the downside to a hole 36 placed on the bottom horizontal-base portion 35 of the hanged frame 34 of the pull-out-force measurement device 33. In other words, the upper portion of the bottom horizontal-base portion 35 only has a portion with just the tight-buffered optical fiber 31, and the lower portion of the bottom horizontal-base portion 35 has a portion of the optical fiber cable 41 with the sheath. Next, the upper portion of the tight-buffered optical fiber 31 without the sheath and the tension members is held by an air chuck 42. Then, the sheath is pulled downward at the pulling speed of 10.0 mm/minute. After an arbitrary length of the sheath is pulled out, the maximum stress is measured from the sensor (load cell) 38 placed on the top horizontal-base portion 37 of the hanged frame 34.

(Coating Strip Force)

The maximum load is measured by a tensile-testing device, when an end portion of the coating of the tight-buffered optical fiber is removed by 20 mm by using a coating-removal tool (Micro-Strip, manufactured by Micro Electronics, Inc). The pulling speed is 100 mm/minute.

When a connector is attached the cable, the coating of the tight-buffered optical fiber needs to be removed to expose the glass fiber. If the coating strip force is 20 N/20 mm or less, then a general coating removal tool can be used to remove such coatings; but if the coating strip force is 5 N/20 mm or less, then the pistoning characteristics of the tight-buffered optical and temperature characteristics of the cable may be affected by it.

Therefore, the coating-strip force is preferably between 5 N/20 mm and 20 N/20 mm.

(Test Under Humid and Hot Environment)

Figure 5:
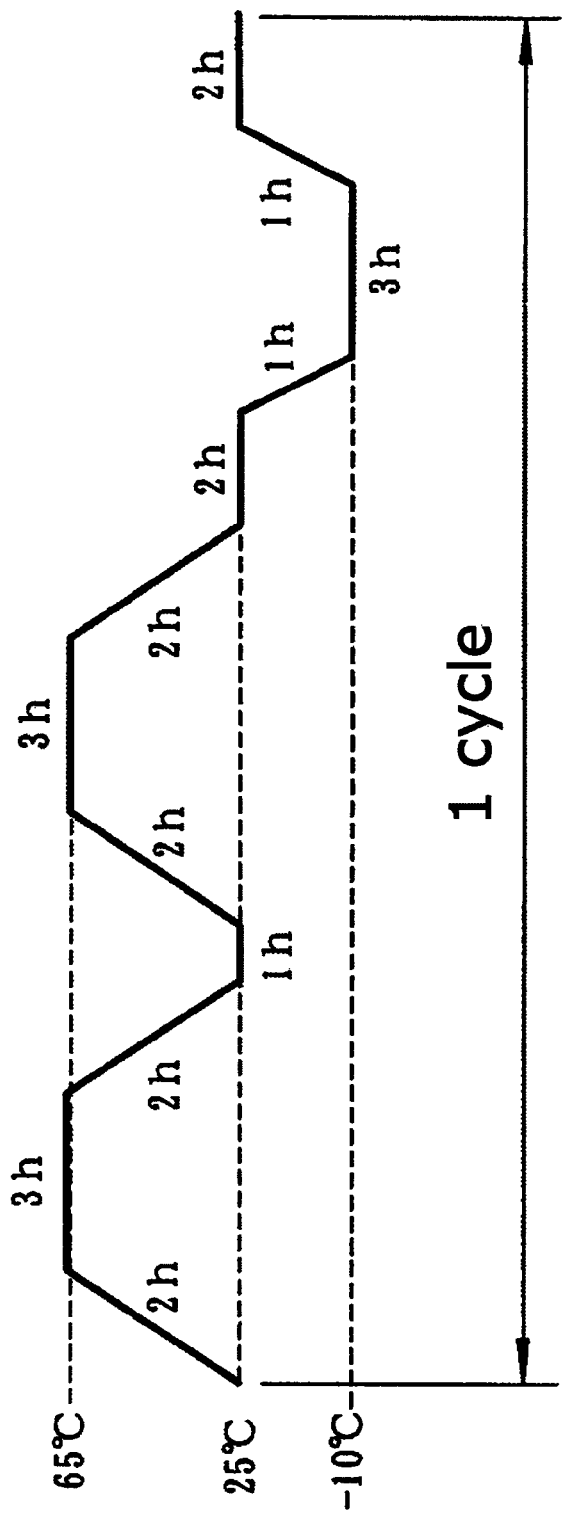
FIG. 5 is a chart, which shows temperature cycle in a heat and humidity test.

The optical fiber cable is subjected to a temperature and humidity cycle regulated by JIS C 60068, which is shown in FIG. 5. Humidity under 20° C. is not specified, but for other temperatures the humidity is set to be 93%. The temperature and humidity cycle is a test to evaluate the effect of respiration of moisture. The test is performed under conditions that are worse than regular tests in order to evaluate the humidity resistance of the optical fiber cable. The temperature and humidity cycle is repeated for 10 cycles, and the fluctuation in transmission loss at 1550 nm is measured by a LED light source and an optical power meter of Yokogawa Electric Corporation during the test.

If the fluctuation in transmission loss is greater than 0.2 dB/km, then it may ca use transmission errors. Because of that, the fluctuation of transmission loss within 0.2 dB/km is marked as 0 in Table 1.

In Table 1, if the second coating layer material is shown as "UV", then urethane-acrylate-type ultraviolet cured resin is used as a resin material for the second coating layer; and if the second coating layer material is shown as "thermoplastics", then a thermoplastic elastomer is used as a resin material for the second coating layer.

As a result of Table 1, when the pull-out force is less than 15 N/20 mm in at least one pair of layers between the first coating layer 12 and the second coating layer 13, or between any two layers of the second coating layer, and the pull-out force between the tight-buffered optical fiber and the sheath is less than 20 N/10 mm; then fluctuation of transmission loss in the test under humid and hot environment can be kept below 0.2 dB/km.

Furthermore, to keep the coating-strip force within a desired range, as shown in examples 1-5 and comparative example 3, the secondary coating layer should have two layers and a pull-out force of 15 N/20 mm or less in at least one pair of layers between the first coating layer and the second coating layer, or between any two layers of the second coating layer; or as shown in FIG. 4, if the secondary coating layer has one layer, then the pull-out force should be 15 N/20 mm or less between the first coating layer and the second coating layer.

However, to satisfy both the coating-strip force and the test under humid and hot environment of the optical fiber cable, the tight-buffered optical fiber needs to have two or more layers in the second coating layer as shown in examples 1-5. With just one layer in the second coating layer, as shown in comparative example 4, the optical fiber cable cannot provide a good result in the test under humid and hot environment.

Also, the reasons for the above result can be expected as follows. By keeping pull-out force low in at least one pair of layers between the first coating layer and the second coating layer, or between any two layers of the second coating layer, and between the tight-buffered optical fiber and the sheath; when moisture enters the cable by exposure to a very humid and hot environment, then moisture is captured between the coating layers and between the tight-buffered optical fiber and the sheath. Even when moisture is accumulated, because adhesion between layers is low, uneven stress can be kept at a low level. Therefore, increases in transmission loss due to microbends in the optical fiber are suppressed.

Because the optical fiber cable of the present invention does not use any special films, it has a good manufacturability and a good optical fiber pull-out capability.

The invention claimed is:

1. A tight buffered optical fiber comprising:
   an optical fiber, which comprises a glass fiber and a first coating layer around the glass fiber, the first coating layer comprising a primary layer Young's modulus of which is less than 3 MPa and a secondary layer Young's modulus of which is larger than 500 MPa; and
   a second coating layer, which has two or more layers, around the optical fiber;
   wherein a pull-out force is less than 15 N/20 mm between the first coating layer and the second coating layer, and
   a pull-out force is less than 15 N/20 mm between any two layers of the second coating layer.

2. The tight buffered optical fiber of claim 1 wherein the second coating layer comprises an inner second coating layer and an outer second coating layer, Young' modulus of the inner coating layer being 200 MPa or less.

3. An optical fiber cable comprising:
   a tight-buffered optical fiber comprising:
   an optical fiber, which comprises a glass fiber and a first coating layer around the glass fiber the first coating layer comprising a primary layer Young's modulus of which is less than 3 MPa and a secondary layer Young's modulus of which is larger than 500 MPa; and
   a second coating layer, which has two or more layers, around the optical fiber;
   wherein a pull-out force is less than 15 N/20 mm between the first coating layer and the second coating layer, and
   a pull-out force is less than 15 N/20 mm between any two layers of the second coating layer; and
   a sheath around the tight-buffered optical fiber;
   wherein a pull-out force between the tight buffered optical fiber and the sheath is less than 20 N/10 mm.

4. The optical fiber cable of claim 3 further comprising a tension member placed in parallel with the tight-buffered optical fiber and on one side of the tight-buffered optical fiber, and a sheath, which covers the tight-buffered optical fiber and the tension member in a unified manner.

5. The optical fiber cable of claim 3 further comprising a pair of tension members placed in parallel with the tight-buffered optical fiber and on both side of the tight-buffered optical fiber, and a sheath, which covers the tight-buffered optical fiber and the pair of tension members in a unified manner.

6. The optical fiber cable of claim 3 wherein the second coating layer comprises an inner second coating layer and an outer second coating layer, Young's modulus of the inner coating layer being 200 MPa or less.

* * * * *